United States Patent
McDaniel et al.

(10) Patent No.: US 9,562,134 B2
(45) Date of Patent: Feb. 7, 2017

(54) CATALYST FOR THE PRODUCTION OF POLYOLS HAVING LOWER AMOUNTS OF HIGH MOLECULAR WEIGHT TAIL

(71) Applicant: Bayer MaterialScience, LLC, Pittsburgh, PA (US)

(72) Inventors: Kenneth G. McDaniel, Charleston, WV (US); George G. Combs, McMurray, PA (US)

(73) Assignee: Covestro LLC, Pittsburgh, PA (US)

( * ) Notice: Subject to any disclaimer, the term of this patent is extended or adjusted under 35 U.S.C. 154(b) by 664 days.

(21) Appl. No.: 13/795,146

(22) Filed: Mar. 12, 2013

(65) Prior Publication Data
US 2014/0275632 A1    Sep. 18, 2014

(51) Int. Cl.
*B01J 27/26* (2006.01)
*C08G 65/26* (2006.01)
*B01J 31/06* (2006.01)
*B01J 31/22* (2006.01)
*B01J 31/16* (2006.01)
*B01J 31/18* (2006.01)

(52) U.S. Cl.
CPC ............ *C08G 65/2663* (2013.01); *B01J 27/26* (2013.01); *B01J 31/06* (2013.01); *B01J 31/068* (2013.01); *B01J 31/2208* (2013.01); *C08G 65/2606* (2013.01); *B01J 31/16* (2013.01); *B01J 31/18* (2013.01); *B01J 2231/14* (2013.01); *B01J 2531/26* (2013.01); *B01J 2531/845* (2013.01); *Y02P 20/52* (2015.11)

(58) Field of Classification Search
USPC .......................... 502/150, 159, 175; 568/620
See application file for complete search history.

(56) References Cited

U.S. PATENT DOCUMENTS

| | | |
|---|---|---|
| 3,278,457 A | 10/1966 | Milgrom |
| 3,278,459 A | 10/1966 | Herold |
| 3,289,505 A | 12/1966 | Pyke |
| 3,427,256 A | 2/1969 | Milgrom |
| 4,477,589 A | 10/1984 | van der Hulst et al. |
| 5,158,922 A | 10/1992 | Hinney et al. |
| 5,470,813 A | 11/1995 | Le-Khac |
| 5,482,908 A | 1/1996 | Le-Khac |
| 5,545,601 A | 8/1996 | Le-Khac |
| 5,627,122 A | 5/1997 | Le-Khac et al. |
| 5,693,584 A | 12/1997 | Le-Khac |
| 5,714,428 A | 2/1998 | Le-Khac |
| 5,777,177 A | 7/1998 | Pazos |
| 5,900,384 A | 5/1999 | Soltani-Ahmadi et al. |
| 5,952,261 A | 9/1999 | Combs |
| 5,998,672 A | 12/1999 | Soltani-Ahmadi et al. |
| 6,008,263 A | 12/1999 | Thompson et al. |
| 6,013,596 A | 1/2000 | Le-Khac et al. |
| 6,051,680 A | 4/2000 | Faraj |
| 6,066,683 A | 5/2000 | Beisner et al. |
| 6,291,388 B1 | 9/2001 | Hofmann et al. |
| 6,423,662 B1 | 7/2002 | Molzahn et al. |
| 6,436,867 B1 | 8/2002 | Dexheimer et al. |
| 6,586,566 B1 | 7/2003 | Hofmann et al. |
| 6,696,383 B1 | 2/2004 | Le-Khac et al. |
| 6,797,665 B2 | 9/2004 | Le-Khac |
| 6,855,658 B1 | 2/2005 | Combs |
| 6,867,162 B2 | 3/2005 | Le-Khac et al. |
| 6,884,826 B2 | 4/2005 | Le-Khac et al. |
| 7,223,832 B2 | 5/2007 | Le-Khac et al. |
| 2004/0102314 A1 | 5/2004 | Le-Khac et al. |
| 2005/0240063 A1 | 10/2005 | Ostrowski et al. |
| 2006/0058182 A1 | 3/2006 | Combs et al. |
| 2008/0167502 A1 | 7/2008 | Bohres et al. |

FOREIGN PATENT DOCUMENTS

| | | |
|---|---|---|
| WO | 0104180 | 1/2001 |
| WO | 2011144523 A1 | 11/2011 |

*Primary Examiner* — Elizabeth Wood
(74) *Attorney, Agent, or Firm* — N. Denise Brown

(57) ABSTRACT

This invention relates to novel double metal cyanide catalysts and to a process for the production of these double metal cyanide catalysts. These DMC catalysts can be used to prepare polyoxyalkylene polyols which have low amounts of high molecular weight tail compared polyoxyalkylene polyols prepared from DMC catalysts of the prior art.

13 Claims, No Drawings

CATALYST FOR THE PRODUCTION OF POLYOLS HAVING LOWER AMOUNTS OF HIGH MOLECULAR WEIGHT TAIL

BACKGROUND OF THE INVENTION

This invention relates to an improved double metal cyanide catalyst which exhibits lower amounts of high molecular weight tail and to a process for preparing this improved double metal cyanide catalyst.

The preparation of polyoxyalkylene polyols comprises oxyalkyating starter compounds having active hydrogen atoms with alkylene oxides in the presence of a suitable catalyst. For many years, basic catalysts as well as DMC catalysts have been used in these oxyalkylation reactions. Base-catalyzed oxyalkylation involves addition of alkylene oxides such as propylene oxide or ethylene oxide to low molecular weight starter compound such as propylene glycol or glycerine in the presence of a basic catalyst such as potassium hydroxide (KOH) to form a polyoxyalkylene polyol.

In base-catalyzed oxyalkylation reactions, propylene oxide and certain other alkylene oxides are subject to a competing internal rearrangement which generates unsaturated alcohols. For example, when KOH is used to catalyze an oxyalkylation reaction using propylene oxide, the resulting product will contain allyl alcohol-initiated, monofunctional impurities. As the molecular weight of the polyol increases, the isomerization reaction becomes more prevalent. As a result, 800 or higher equivalent weight poly (propylene oxide) products prepared using KOH tend to have significant quantities of monofunctional impurities. These monofunctional impurities tend to reduce the average functionality and broaden the molecular weight distribution of the polyol.

DMC catalysts, unlike basic catalysts, do not significantly promote the isomerization of propylene oxide. As a result, DMC catalysts are suitable for the preparation of polyols which have low unsaturation values and relatively high molecular weights. DMC catalysts can be used to produce polyether, polyester and polyetherester polyols which are useful in applications such as polyurethane coatings, elastomers, sealants, foams and adhesives.

DMC catalysts are known and various processes for their preparation are described in, for example, U.S. Pat. Nos. 3,278,457, 3,278,459, 3,289,505, 3,427,256, 4,477,589, 5,158,922, 5,470,813, 5,482,908, 5,545,601, 5,627,122, 5,693,584, 5,714,428, 5,900,384, 5,952,261, 5,998,672, 6,013,596, 6,291,388, 6,423,662, 6,436,867, 6,586,566, 6,696,383, 6,797,665, 6,855,658, 6,867,162, 6,884,826 and 7,223,832, as well as in WO 01/04180. DMC catalysts are typically prepared by mixing an aqueous solution of a metal salt with an aqueous solution of a metal cyanide salt in the presence of an organic complexing ligand. A precipitate forms when these two solutions are mixed together. The resulting precipitate is isolated and then washed to remove excess metals salts and alkali metal salts that may be present in the catalyst matrix as disclosed by U.S. Pat. Nos. 3,278, 457 and 6,423,662, and WO 01/04180.

DMC-catalyzed oxyalkylation reactions are also known, however, to produce small amounts of high molecular weight polyol impurities with, molecular weights that are typically in excess of 100,000 Da. These high molecular weight impurities are often referred to as the "high molecular weight tail" or HMWT. In elastomers and other systems, the high molecular weight tail may interfere with hard segment phase out as well as with the alignment of hard segments responsible for strength and modulus properties. In polyurethane foam systems, polyols which have a high molecular weight propylene oxide-rich tail produce course foam cells, very tight foams, weak foams, or contribute to foam collapse.

There has been considerable effort to find ways to reduce the high molecular weight tail that forms in polyoxyalkylene polyols due to polymerization of alkylene oxides in the presence of a DMC catalyst. These include both manipulation of processing parameters such as level and placement of ethylene oxide in the chemical structure of polyether polyols and chemical modifications of the catalyst composition. Mechanical means such as high shear mixing to destroy the higher fraction of high molecular weight tail, sonication to reduce catalyst particle size, and pre-activation of the catalyst with filtration to remove the larger particles may have been considered but deemed impractical for a commercial process.

U.S. Pat. No. 5,777,177 describes a continuous addition of starter or "CAOS" process where a low molecular weight hydroxyl compound such as glycerine is added to the reactor simultaneously along with the alkylene oxide to reduce the level of high molecular weight tail formed with DMC catalyst. This technique has been combined with strategic random incorporation of ethylene oxide or other suitable comonomers during the propoxylation process to mitigate the negative effects of high molecular weight tail on preparation of flexible foam products as taught in U.S. Pat. Nos. 6,066,683 and 6,008,263.

Chemical modification of DMC catalysts is described in U.S. Pat. No. 6,051,680 where alkyl substituted reactive silane compounds are applied to the dried catalyst slurried in a suitable solvent such that the concentration of "unbonded" zinc hydroxyl groups is reduced and significant reductions in the level of high molecular weight tail are observed. Although no actual reaction rate data is provided, a slightly broadened polydispersity is noted in the examples versus the control which indicates a lower activity for the silylated DMC catalyst.

U.S. Pat. Nos. 6,696,383, 6,867,162 and 7,223,832 disclose DMC catalysts prepared from at least one metal salt, at least one metal cyanide salt, at least one organic complexing agent, at least one alkali metal salt, and optionally, at least one functionalized polymer, in which the alkali metal salt is added to the catalyst in an amount such that the catalyst includes from 0.4 to 6 wt. % of the alkali metal. These patents also disclose a process of preparing these DMC catalysts and a process for preparing polyols from these DMC catalysts. Suitable alkali metal salts include alkali metal halides such as sodium chloride, sodium bromide, lithium chloride, lithium iodide, potassium chloride, potassium bromide, potassium iodide, and mixtures thereof.

Thus far, most of the methods that involve chemical modifications of the catalyst to reduce high molecular weight tail in polyoxyalkylene polyols have the disadvantage that catalyst reactivity is reduced. In essence, this means that the reaction takes longer to complete or more catalyst is necessary to attain the same reaction rate. This includes the DMC catalysts described in U.S. Pat. Nos. 6,696,383, 6,867,162 and 7,223,832. It is necessary to increase the amount of the DMC catalysts of these references to more than about 100 ppm to of catalyst, based on total weight of final product to obtain the same reaction rate measured with about 30 ppm of a conventional high activity DMC catalyst such as that described in, for example, U.S. Pat. No. 5,482,908. Other literature such as U.S. Pat. No. 5,952,261 and U.S. Patent application 2006/0058182 disclose the addition of cyanide-free metal salts during the catalyst precipitation step to obtain highly active catalyst that are effective at 30 ppm or less but they do not disclose or claim any reductions in the amount of high molecular weight tail produced in the alkylene oxide polymerization process to make polyols.

Therefore, a need still exits for highly active DMC catalyst compositions and a process for their use where the resultant polyols contain significantly less high molecular weight tail impurities. A goal of the present invention is to provide a novel DMC catalyst that is effective in reducing high molecular weight tail in polyoxyalkylene polyols while maintaining the high reactivity of conventional DMC catalysts.

SUMMARY OF THE INVENTION

This invention relates to a novel double-metal cyanide catalyst comprising:
(a) at least one metal salt,
(b) at least one metal cyanide salt,
(c) at least one alkali metal salt of an oxyacid with a pKa equal to or less than 3.5.
(d) at least one organic complexing ligand, and
(e) optionally, one or more functionalized polymers;
wherein alkali metal is present in the catalyst in an amount of from 0.4 to 10 wt. %, preferably from 0.8 to 8 wt. %, based on the total weight of the catalyst.

The present invention also relates to a process for the preparation of these novel double metal cyanide catalysts. This process comprises:
(1) reacting (a) at least one metal salt, (b) at least one metal cyanide salt, and (c) at least one alkali metal salt of an oxyacid with a pKa equal to or less than 3.5, in the presence of (d) at least one organic complexing ligand, and, (e) optionally, one or more functionalized polymers; under conditions sufficient to form a catalyst, wherein alkali metal is present in the catalyst in an amount of from 0.4 to 10 wt. %, preferably from 0.8 to 8%, based on the total weight of the catalyst.

DETAILED DESCRIPTION OF THE INVENTION

The present invention will now be described for purposes of illustration and not limitation. Except in the operating examples, or where otherwise indicated, all numbers expressing quantities, percentages, OH numbers, functionalities and so forth in the specification are to be understood as being modified in all instances by the term "about." Any of the upper and lower limits of ranges disclosed herein may be used in any combination, except in the operating examples or unless otherwise indicated. All ranges are inclusive of the end points unless expressly stated otherwise. Equivalent weights and molecular weights given herein in Daltons (Da) are number average equivalent weights and number average molecular weights respectively, unless indicated otherwise.

The present invention is directed to a novel double metal cyanide (DMC) catalyst. This novel DMC catalyst comprises: (a) at least one metal salt, (b) at least one metal cyanide salt, (c) at least one alkali metal salt of an oxyacid with a pKa equal to or less than 3.5, (d) at least one organic complexing agent, and, (e) optionally, one or more functionalized polymers; wherein alkali metal is present in the catalyst in an amount of from 0.4 to 10 wt. %, preferably from 0.8 to 8 wt. %, based on the total weight of the catalyst.

The present invention also relates to a process for preparing these novel double metal cyanide catalysts. This process comprises
(1) reacting (a) at least one metal salt, (b) at least one metal cyanide salt, and (c) at least one alkali metal salt of an oxyacid with a pKa equal to or less than 3.5, in the presence of (d) at least one organic complexing ligand, and, (e) optionally, one or more functionalized polymers; under conditions sufficient to form a catalyst, wherein alkali metal is present in the catalyst in an amount of from 0.4 to 10 wt. %, preferably from 0.8 to 8%, based on the total weight of the catalyst.

Since one mechanism to explain the production of high molecular weight tail (HMWT) with DMC catalysts involves limited exchange at the active polymerization site with active hydrogen compounds due to structural steric restrictions, incorporation of alkali metal salts of these oxyacids is believed to disrupt the precipitation process such that the polymerization sites of the catalyst are more accessible. In particular, alkali metal salts of oxyacids with pKa's equal to or less than 3.5, preferably with pKa's equal to or less than 3.0, possess the proper balance of ion stability and electronegativity in aqueous media to be taken up by the catalyst with little impact on reactivity.

Another aspect of the present invention is a process for preparing a polyol comprising reacting i) at least one starter compound having active hydrogen atoms with ii) at least one alkylene oxide in the presence of iii) at least one DMC catalyst which is prepared according to the process of the present invention, under conditions sufficient to form a polyol.

In accordance with the present invention, suitable metal salts to be used as component (a) herein include virtually any known metal salt as described in U.S. Pat. Nos. 5,482,908 and 5,783,513, the disclosures of which are herein incorporated by reference. Preferably, these metal salts are water soluble and comprised of Zn(II), Fe(II), Co(II), or Ni(II). Examples of metal salts which are useful in the present invention include, for example, zinc chloride, zinc sulfate, zinc bromide, zinc acetate, zinc acetylacetonate, zinc benzoate, zinc nitrate, zinc propionate, zinc formate, iron(II) sulfate, iron(II) bromide, cobalt(II) chloride, cobalt(II) thiocyanate, nickel(II) formate, nickel(II) nitrate, and the like, and mixtures thereof. Zinc chloride is most preferred.

Any metal cyanide salt can be used as component (b) in the present invention such as those described in U.S. Pat. Nos. 5,482,908 and 5,783,513, the disclosures of which are herein incorporated by reference. It is preferred that the metal cyanide salt be water soluble and some examples of metal cyanide salts which can be used in the present invention include, for example, cyanometallic acids and water-soluble metal cyanide salts such as potassium hexacyanocobaltate(III), potassium hexacyanoferrate(II), potassium hexacyanoferrate(III), lithium hexacyanoiridate(III), lithium hexacyanocobaltate(III), sodium hexacyanocobaltate(III), calcium hexacyanocobaltate(III), cesium hexacyanocobaltate(III), with alkali metal hexyacyanocobaltates being most preferred as component (b) in accordance with the present invention.

Suitable alkali metal compounds to be used as component (c) in accordance with the present invention include alkali metal salts of sulfuric, sulfonic, sulfurous, phosphoric, nitric, and nitrous acids. Suitable compounds based on carboxylic acids include alkali metal salts of halogenated acetic acids such as chloroacetic acid, bromoacetic acid, trichloroacetic acid, trifluoroacetic acid, and substituted benzoic acids such as nitrobenzoic acid and bromobenzoic acid.

Most preferred are the alkali metal salts of sulfuric, sulfonic, and nitric acids. Although any alkali metal salt of oxyacids with pKa's less than or equal to 3.5 are useful for practice of the invention, those compounds comprised of the Group 1A elements sodium, potassium, and cesium are preferred, with potassium being most preferred. Obviously mixtures of these metals are also suitable for practice of the invention.

Any organic complexing ligand can be used as component (d) in the present invention. Organic complexing ligands useful in the present invention are known and are described in, for example, U.S. Pat. Nos. 3,404,109, 3,829,505, 3,941, 849, 5,158,922, 5,545,601, 5,470,813, 5,482,908, 5,536,883, 5,627,120, 5,637,673, 5,712,216, 5,789,626, as well as in JP 4145123, the disclosures of which are all herein incorporated by reference. Organic complexing ligands useful in the present invention include, for example, water-soluble organic compounds with heteroatoms, such as oxygen, nitrogen, phosphorus or sulphur, which can form complexes with the DMC compound.

Suitable organic complexing ligands useful in the present invention include, for example, alcohols, aldehydes, ketones, ethers, esters, amides, ureas, nitriles, sulfides and mixtures thereof. Preferred organic complexing ligands useful in the present invention include water-soluble aliphatic alcohols, such as, for example, ethanol, isopropanol, n-butanol, iso-butanol, sec-butanol, 2-methyl-3-butene-2-ol, and tert-butanol. Tert-butanol and 2-methyl-3-butene-2-ol are particularly preferred.

The relative amounts of organic complexing ligand and alkali metal salt found in the catalyst of the present invention can vary. A skilled person can control catalyst structure, activity, resultant polyol viscosity, unsaturation and the like by varying these amounts. Preferably, DMC catalysts produced by the process of the present invention are composed of at least one alkaline metal which is present in an amount within the range of from about 0.4 to about 10 wt. %, more preferably, from about 0.8 to about 8 wt. %, most preferably, from about 0.8 to about 7 wt. %, based on the total weight of the DMC catalyst.

DMC catalysts of the present invention can optionally include at least one functionalized polymer. "Functionalized polymer" is defined as a polymer or its salt which contains one or more functional groups including, for example, oxygen, nitrogen, sulfur, phosphorus or halogen as disclosed in U.S. Pat. No. 5,714,428 which is incorporated herein by reference. Examples of functionalized polymers useful in the present invention include, for example: polyethers; polyesters; polycarbonates; polyalkylene glycol sorbitan esters; polyalkylene glycol glycidyl ethers; polyacrylamides; poly (acrylamide-co-acrylic acids), polyacrylic acids, poly (acrylic acid-co-maleic acids), poly(N-vinylpyrrolidone-co-acrylic acids), poly(acrylic acid-co-styrenes) and their salts; maleic acids, styrenes and maleic anhydride copolymers and their salts; block copolymers which are composed of branched chain ethoxylated alcohols; alkoxylated alcohols such as NEODOL which is sold commercially by Shell Chemical Company; polyether; polyacrylonitriles; polyalkyl acrylates; polyalkyl methacrylates; polyvinyl methyl ethers; polyvinyl ethyl ethers; polyvinyl acetates; polyvinyl alcohols; poly-N-vinylpyrrolidones; polyvinyl methyl ketones; poly(4-vinylphenols); oxazoline polymers; polyalkyleneimines; hydroxyethylcelluloses; polyacetals; glycidyl ethers; glycosides; carboxylic acid esters of polyhydric alcohols; bile acids and their salts, esters or amides; cyclodextrins; phosphorus compounds; unsaturated carboxylic acid esters; and ionic surface- or interface-active compounds. Polyether polyols are preferably used with polyether polyols comprised of propylene and ethylene oxide being most preferred.

When used, functionalized polymers are present in the DMC catalyst in an amount within the range of from about 2 to about 80 wt. %, preferably, within the range of from about 5 to about 70 wt. %, more preferably, within the range of from about 10 to about 60 wt. %, based on the total weight of DMC catalyst.

The combination of (a) metal salt, (b) metal cyanide salt, (c) alkali metal salt of an oxyacid with a pKa equal to or less than 3.5, (d) organic complexing ligand and, optionally, (e) functionalized polymer, can be accomplished by any of the methods known in the art. Such methods include, for example, precipitation, dispersion and incipient wetness. Preferably, the process of the present invention involves using a precipitation method in which an aqueous solution of (a) at least one metal salt employed in a stoichiometric excess, i.e., at least 50 mol. %, based on the molar amount of (b) metal cyanide salt, is mixed with an aqueous solution of (b) at least one metal cyanide salt, (c) at least one alkali metal salt of an oxyacid with a pKa equal to or less than 3.5 and, optionally, (e) one or more functionalized polymers, in the presence of (d) at least one organic complexing ligand.

The (c) alkali metal salt of an oxyacid with the specified pKa can be added to either the aqueous solution of (a) metal salt or to the aqueous solution of (b) metal cyanide salt or to both solutions or to the mixture after the two solutions are combined. Preferably, (c) the alkali metal salt or mixture of alkali metal salts of oxyacids with pKa equal to or less than 3.5 is added to the aqueous solution of (a) metal salt prior to the precipitation step. The (d) organic complexing ligand can be added to either the aqueous solution of (a) metal salt or to the aqueous solution of (b) metal cyanide salt or to both solutions or to the mixture after the two solutions are combined or it can be added after formation of the precipitate. It is preferred that (d) the organic complexing ligand be add to both (a) the metal salt solution and (b) the metal cyanide salt solution prior to the precipitation step. The (e) functionalized polymer can be added to either the aqueous solution of (a) metal salt or to the aqueous solution of (b) metal cyanide salt or to both solutions or to the mixture after the two solutions are combined and the precipitate is formed. Preferably, (e) the functionalized polymer is added to the mixture after the precipitate is formed.

The reactants are mixed using any of the mixing methods known in the art, such as, for example, by simple mixing, high-shear mixing or homogenization. Preferably, the reactants are combined with simple mixing at a temperature within the range of from about room temperature to about 80° C. to form a precipitate.

The resulting precipitate is isolated from suspension by known techniques such as, for example, by centrifugation, filtration, filtration under pressure, decanting, phase separation or aqueous separation.

The isolated precipitate is preferably washed at least once with water and/or with a mixture which is preferably composed of water and at least one organic complexing ligand. More preferably, this mixture is composed of water, at least one organic complexing ligand and at least one alkali metal salt compound. Most preferably, this mixture is composed of water, at least one organic complexing ligand, at least one alkali metal salt compound, and at least one functionalized polymer.

Various methods for preparing DMC compounds which are useful for epoxide polymerization are fully described in many references. These references include, for example, U.S. Pat. Nos. 3,278,457, 3,427,256, 3,427,334, 3,427,335, 3,941,849, 4,477,589, 4,843,054, 5,158,922, 5,470,813, 5,482,908, 5,998,672, 6,291,388, 6,867,162, and Japanese Pat. Appl. Kokai No. 4145123, the disclosures of these references related to conventional catalyst preparation and suitable DMC compounds are incorporated herein by reference.

The present invention is also directed to a process for preparing a polyol in the presence of a DMC catalyst of or prepared according to the present invention.

Any starter compound which has active hydrogen atoms can be used in the present invention. Starter compounds which are useful in the present invention include compounds having number average molecular weights between 18 and 2,000, preferably between 32 and 2,000, and which contain from 1 to 8 hydroxyl groups. Examples of starter compounds which can be used in the present invention include, for example, polyoxypropylene polyols, polyoxyethylene polyols, polytetatramethylene ether glycols, glycerol, propoxylated glycerols, propylene glycol, tripropylene glycol, alkoxylated allylic alcohols, bisphenol A, pentaerythritol, sorbitol, sucrose, degraded starch, Mannich polyols, water and mixtures thereof. Additional polyols suitable as starters are copolymers of ethylene and propylene oxide and others described in U.S. Pat. No. 6,066,683, the disclosure of which is herein incorporated by reference.

Monomers or polymers which will copolymerize with an alkylene oxide in the presence of a DMC catalyst can be included in the process of the present invention to produce various types of polyols. The build-up of the polymer chains by alkoxylation can be accomplished randomly or blockwise. Additionally, any copolymer known in the art made using a conventional DMC catalyst can be made with the DMC catalyst prepared according to the process of the present invention.

Any alkylene oxide can be used in the present invention. Alkylene oxides preferably used in the present invention include, for example, ethylene oxide, propylene oxide, butylene oxide and mixtures thereof.

Oxyalkylation of the starter compound can be accomplished by any of the methods known in the art, such as, for example, in a batch, semi-batch or continuous process. Oxyalkylation is carried out at a temperature in the range of from about 20 and 200° C., preferably from about 40 and 180° C., and more preferably from about 50 and 150° C., and under an overall pressure of from about 0.0001 to about 20 bar. The amount of DMC catalyst used in the oxyalkylation reaction is chosen such that sufficient control of the reaction is possible under the given reaction conditions. The DMC catalyst concentration of an oxyalkylation reaction is typically in the range of from about 0.0005 wt. % to about 1 wt. %, preferably from about 0 0.001 wt. % to about 0.1 wt. %, and more preferably from about 0.001 to about 0.005 wt. %, based on the total weight of polyol to be prepared.

The number average molecular weight of the polyol prepared by the process of the present invention is in the range of from about 500 to about 100,000 g/mol, preferably from about 1,000 to about 20,000 g/mol, and more preferably from about 2,000 to about 16,000 g/mol. Polyols prepared by the process of the present invention have average hydroxyl functionalities of from about 1 to 8, preferably from about 2 to 6, and more preferably from about 2 to 4.

The novel DMC catalysts of the present invention can be used to produce polyols which have reduced levels of high molecular weight tail (i.e. greater than 40 K) while providing substantially improved reactivity compared to alkali metal modified catalysts of the prior art. The amount of high molecular weight tail is quantified by any suitable method. A particularly convenient way to measure the amount of high molecular weight tail is by gel permeation chromatography (GPC). A suitable technique for measuring high molecular weight tail is described in U.S. Pat. No. 5,777,177 as well as in, for example, U.S. Pat. No. 6,013,596, the disclosures of which are herein incorporated by reference. A preferred GPC column for execution of the analysis is a Jordi Gel DVB Mixed Bed, 250 mM×10 mM which is used to measure the amount of polyol component in ppm having a number average molecular weight (Mn) from 40,000 to >400,000.

The following examples further illustrate details for the preparation and use of the compositions of this invention. The invention, which is set forth in the foregoing disclosure, is not to be limited either in spirit or scope by these examples. Those skilled in the art will readily understand that known variations of the conditions and processes of the following preparative procedures can be used to prepare these compositions. Unless otherwise noted, all temperatures are degrees Celsius and all parts and percentages are parts by weight and percentages by weight, respectively.

EXAMPLES

Example 1

Preparation of a DMC Catalyst Using Potassium Nitrate and a Polyoxypropylene Diol An aqueous solution containing 120 g (0.88 moles) of $ZnCl_2$ and 38 grams (0.513 moles) of tert-butyl alcohol in 230 grams of deionized water was prepared and heated to 50° C. in a one-liter stirred reactor (Solution 1). Potassium hexacyanocobaltate (8.1 grams, 0.0243 moles) and potassium nitrate (5.85 grams, 0.0579 moles) were dissolved in a 500-ml beaker with deionized water (110 grams) and tert-butyl alcohol (17.2 grams, 0.232 moles) (Solution 2). Solution 3 was prepared by dissolving a 1000 mol. wt. polyoxypropylene diol (8 grams) in deionized water (50 grams) and tert-butyl alcohol (2 grams). Solution 2 was added to Solution 1 over 42 min. at 3.0 grams/minute while mixing at 500 rpm. The reaction temperature was kept at 50° C. during the course of the reaction by using an internal coil for heating or cooling. Following the addition, mixing continued at 500 rpm for 20 min. The mixing rate was reduced and solution 3 was added, followed by continued slow stirring for 3 minutes.

The reaction mixture was filtered at 40 psig through a 0.45µ nylon membrane. The catalyst cake was re-slurried in a mixture of tert-butyl alcohol (100 grams), deionized water (55 grams) and potassium nitrate (2.72 grams) and mixed at 500 rpm for 20 minutes at 50° C. The mixing rate was reduced, 1000 mol. wt. polyoxypropylene diol (2 grams) was added and slow mixing was continued for 3 min. The catalyst was filtered as previously described. The filtered cake was re-slurried in tert-butyl alcohol (125 grams), deionized water (30 grams) and potassium nitrate (1.36 grams) and mixed as described above at 50° C. for 20 minutes at 500 rpm. 1000 mol. wt. polyoxypropylene diol (2.0 grams) was added at a reduced stirring rate which was continued for 3 minutes and the product was filtered as described above. The filtered cake was re-slurried for a third time in tert-butyl alcohol (144 grams) and mixed as described above. 1000 mol. wt. polyoxypropylene diol (1.0 grams) was added with gentle agitation for 3 minutes and the product was filtered as described above. The final resulting catalyst precipitate was dried in a vacuum oven at 50° C. for 2 hours. After grinding the partially dried catalyst precipitate, it was further dried in a vacuum over at 50° C. for 2 more hours.

Elemental Analysis:

Cobalt=10.0 wt. %; Zinc=22.2 wt. %; Potassium=1.20 wt. %; Chlorine=3.75 wt. %

Example 2

Preparation of a DMC Catalyst Using Potassium Sulfate and a Polyoxypropylene Diol An aqueous solution containing 120 grams (0.88 moles) $ZnCl_2$, deionized water (230 grams), tert-butyl alcohol (38 grams, 0.513 moles), and potassium sulfate (5.03 grams, 0.029 moles) was prepared and heated to 50° C. in a one-liter stirred reactor (Solution 1). Potassium hexacyanocobaltate (8.1 grams, 0.0243 moles) was dissolved in a 500-ml beaker with deionized water (110 grams) and tert-butyl alcohol (17.2 grams, 0.232 moles) (Solution 2). Solution 3 was prepared by dissolving a 1000 mol. wt. polyoxypropylene diol (8 grams) in deionized water (50 grams) and tert-butyl alcohol (2 grams). Solution 2 was added to Solution 1 over 42 minutes at 3.0 grams/minute while mixing at 500 rpm. The reaction temperature was kept at 50° C. during the course of the reaction by using an internal coil for heating or cooling. Following the addition, mixing continued at 500 rpm for 20 min. The mixing rate was reduced and solution 3 was added, followed by continued slow stirring for 3 min.

The reaction mixture was filtered at 40 psig through a 0.45µ nylon membrane. A solution (Solution 4) of deionized water (100 grams) and potassium sulfate (3.90 grams.) was prepared. The catalyst filtered cake was re-slurried in a mixture of tert-butyl alcohol (100 grams) and Solution 4 (55 grams), and mixed at 500 rpm for 20 minutes at 50 C. The mixing rate was reduced, 1000 mol. wt. polyoxypropylene diol (2 grams) was added and slow mixing was continued for 3 min. The catalyst was filtered as described above. The filtered cake was re-slurried in tert-butyl alcohol (125 grams) and Solution 4 (30 grams) and mixed as described above at 50° C. for 20 minutes at 500 rpm. 1000 mol. wt. polyoxypropylene diol (2.0 grams) was added at a reduced stirring rate which was continued for 3 minutes before the product was filtered as described above. The filtered cake was re-slurried for a third time in tert-butyl alcohol (144 grams) and mixed as described above. 1000 mol. wt. polyoxypropylene diol (1.0 gram) was added with gentle agitation for 3 minutes and the product was filtered as described above. The final resulting catalyst precipitate was dried in a vacuum oven at 50° C. for 2 hours. After grinding the partially dried catalyst precipitate, it was further dried in a vacuum over at 50° C. for 2 more hours.

Elemental Analysis:

Cobalt=8.63 wt. %; Zinc=21.0 wt. %; Potassium=6.5 wt. %; Chlorine=3.2 wt. %

Example 3

Preparation of a DMC Catalyst Using Potassium Sulfate and a 2000 MW Polyoxypropylene Diol An aqueous solution containing 120 grams (0.88 moles) of zinc chloride, 38 grams (0.513 moles) of tert-butyl alcohol, and 5.8 grams (0.033 moles) of potassium sulfate in 230 grams of deionized water was prepared and heated to 50° C. in a one-liter stirred reactor (Solution 1). Potassium hexacyanocobaltate (8.91 grams, 0.030 moles) was dissolved in a 500-ml beaker with deionized water (110 grams) and tert-butyl alcohol (18.92 grams, 0.255 moles) (Solution 2). Solution 3 was prepared by dissolving a 2000 mol. wt. polyoxypropylene diol (8 grams) in deionized water (50 grams) and tert-butyl alcohol (2 grams). Solution 2 was added to Solution 1 over 42 min. at 3.0 grams/minute while mixing at 500 rpm. The reaction temperature was kept at 50° C. during the course of the reaction by using an internal coil for heating or cooling. Following the addition, mixing continued at 500 rpm for 20 min. The mixing rate was reduced and solution 3 was added, followed by continued slow stirring for 3 min.

The reaction mixture was filtered at 40 psig through a 0.45µ nylon membrane. A solution of potassium sulfate (3.9 grams) in water (100 g.) was prepared (Solution 4). The catalyst filtered cake was re-slurried in a mixture of tert-butyl alcohol (100 grams) and Solution 4 (55 grams) and mixed at 500 rpm for 20 min. at 50° C. The mixing rate was reduced and a solution containing 2.0 grams of 2000 mol. wt. polyoxypropylene diol, 26 grams of tert-butyl alcohol and 14.2 grams of distilled water was added to the mixture and slow stirring was continued for 3 min. The catalyst was filtered as described above. The cake was re-slurried for a second time in tert-butyl alcohol (144 g.) and mixed at 50° C. for 20 minutes at 500 rpm. 2000 mol. wt. polyoxypropylene diol (1.0 g.) was added with gentle agitation and the product was stirred slowly for 3 minutes. Then the mixture was filtered as described above. The resulting catalyst precipitate was dried in a vacuum oven at 50° C. for 2 hours. After grinding the partially dried catalyst precipitate, it was dried further in a vacuum over at 50° C. for 2 more hours.

Elemental Analysis:

Potassium=4.5 wt. %

Polyol Preparation:

As illustrated in Table 1, DMC catalysts prepared according to the process of the present invention, such as those prepared in Examples 1 and 2 (prepared with potassium nitrate or potassium sulfate, tert-butyl alcohol as the organic complexing ligand, and a polyoxypropylene diol as the functionalized polymer) can be used to produce polyols which have an acceptable amount of high molecular weight tail.

Some of the catalysts made herein were evaluated for propoxylation activity and polyol quality by preparing a 6 k triol from a glycerine-based PO, block polyol having an OH number of 238 and a functionality of about 3. Briefly, a polyol reactor equipped with four pitched blade turbines and baffles was charged with the starter polyol and catalyst and the mixture was heated to 130° C. under vacuum with a helium sparge at 500 rpm for 45 minutes. The agitation rate was increased to 900 rpm and propylene oxide was feed to the reactor at a slow rate to confirm activation of the catalyst. The oxide monomer was feed to the reactor over a four hour period. Rates were calculated by monitoring drops in PO partial pressures the moment oxide addition was completed. Calculated apparent rate constants ($k_{app}$) are shown in Table 1 below. These values were determined by plotting the natural logarithm of PO partial pressure versus time and determining the slope of the resultant straight line. The catalyst levels disclosed in Table 1 are based on the amount of catalyst charged divided by the weight of total product.

TABLE 1

| Example | Control[1] | Comparative Example[2] | Example 1 Catalyst | Example 2 Catalyst |
|---|---|---|---|---|
| Alkali Metal Salt Added | None | KCl | KNO$_3$ | K$_2$SO$_4$ |
| K in Catalyst (Wt. %) | 0.33 | 3.5 | 1.2 | 6.5 |
| Kapp | 2.08 | 1.19 | 1.78 | 1.75 |
| Catalyst Level (ppm) | 25.8 | 100.9 | 32.6 | 25.9 |
| 6000 MW Triol data | | | | |
| OH # [mg KOH/g] | 28.5 | 27.3 | 27.4 | 27.2 |
| Viscosity 25° C. [cks] | 1272 | 1286 | 1255 | 1267 |
| HMW Tail[3] | (ppm) | (ppm) | (ppm) | (ppm) |
| 40-60K | 1549 | 818 | 977 | 907 |
| 60-80K | 428 | 236 | 274 | 247 |
| 80-100K | 325 | 167 | 194 | 164 |
| 100-200K | 538 | 279 | 350 | 305 |
| 200-400K | 212 | 80 | 145 | 118 |
| >400K | 43 | 8 | 23 | 10 |

[1] Conventional DMC Catalyst made in accordance with the inventive processes of U.S. Pat. No. 5,482,908.
[2] Alkali Metal DMC catalyst prepared in accordance with the inventive processes of U.S. Pat. No. 6,867,162
[3] HMW Tail based on a six-portion cut GPC.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A double-metal cyanide catalyst comprising:
   (a) at least one metal salt,
   (b) at least one metal cyanide salt,
   (c) at least one alkali metal salt of an oxyacid with a pKa equal to or less than 3.5,
   (d) at least one organic complexing ligand, and
   (e) optionally, one or more functionalized polymers;
   wherein alkali metal is present in the catalyst in an amount of from 0.4 to 10 wt. %, based on the total weight of the catalyst.

2. The double-metal cyanide catalyst of claim 1, wherein alkali metal is present in the catalyst in an amount of from 0.8 to 8 wt. %, based on the total weight of the catalyst.

3. The double-metal cyanide catalyst of claim 1, wherein the oxyacid has a pKa equal to or less than 3.0.

4. The double-metal cyanide catalyst of claim 1, wherein the oxyacid is selected from the group consisting of sulfuric acid, sulfonic acid, sulfurous acid, phosphoric acid, nitric acid, nitrous acid and mixtures thereof.

5. The double-metal cyanide catalyst of claim 1, wherein the alkali metal of (c) said alkali metal salt is selected from the group consisting of sodium, potassium, cesium and mixtures thereof.

6. The double-metal cyanide catalyst of claim 1, wherein (c) said alkali metal salt is selected from the group consisting of potassium nitrate, potassium sulfate and mixtures thereof.

7. A process for preparing a double-metal cyanide catalyst comprising
   (1) reacting
      (a) at least one metal salt,
      (b) at least one metal cyanide salt, and
      (c) at least one alkali metal salt of an oxyacid with a pKa equal to or less than 3.5,
      in the presence of
      (d) at least one organic complexing ligand, and
      (e) optionally, one or more functionalized polymer;
      under conditions sufficient to form a catalyst, wherein alkali metal is present in the catalyst in an amount of from 0.4 to 10 wt. %, based on the total weight of the catalyst.

8. The process of claim 7, wherein alkali metal is present in the catalyst in an amount of from 0.8 to 8 wt. %, based on the total weight of the catalyst.

9. The process of claim 7, wherein the oxyacid has a pKa equal to or less than 3.0.

10. The process of claim 7, wherein the oxyacid is selected from the group consisting of sulfuric acid, sulfonic acid, sulfurous acid, phosphoric acid, nitric acid, nitrous acid and mixtures thereof.

11. The process of claim 7, wherein the alkali metal of (c) said alkali metal salt is selected from the group consisting of sodium, potassium, cesium and mixtures thereof.

12. The process of claim 7, wherein (c) said alkali metal salt is selected from the group consisting of potassium nitrate, potassium sulfate and mixtures thereof.

13. A process for preparing a polyoxyalkylene polyol comprising reacting i) at least one starter compound having active hydrogen atoms, with ii) at least one alkylene oxide, in the presence of iii) the double-metal cyanide catalyst of claim 1.

* * * * *